UNITED STATES PATENT OFFICE.

THOMAS TWYNAM, OF LONDON, ENGLAND.

PROCESS OF PRODUCING SOLUBLE ALKALINE PHOSPHATES.

SPECIFICATION forming part of Letters Patent No. 361,656, dated April 19, 1887.

Application filed March 8, 1886. Serial No. 194,484. (No specimens.) Patented in England June 5, 1885, No. 6,867, and in Germany March 6, 1886, No. 38,156.

*To all whom it may concern:*

Be it known that I, THOMAS TWYNAM, a subject of Her Majesty the Queen of Great Britain, residing at Minford Gardens, West Kensington Park, London, England, have invented a certain new and useful Improved Process for Producing Soluble Alkaline Phosphates, (the said invention having been patented in England under date of June 5, 1885, No. 6,867, and in Germany under date of March 6, 1886, No. 38,156;) and I do hereby declare that the following is a full, clear, and exact description of the invention, which will enable others skilled in the art to which it appertains to make and use the same.

This invention relates to the production of alkaline phosphates from phosphoric slags produced in the manufacture of steel or ingot-iron when alkaline salt has been added in the furnace or converter for the purpose of eliminating the phosphorus during the conversion of phosphoric pig-iron into steel or ingot-iron. It has been proposed to employ alkaline carbonates or chlorides as the alkaline addition to be made in the converter. I find, however, that the alkaline slag produced thereby does not contain the phosphoric acid wholly in the soluble state, a very large percentage of it being usually insoluble. Both these alkaline salts also have the disadvantage of being largely volatilized at the great heat employed, and thereby exert a great cooling effect upon the metal. The first of these disadvantages (the greater or less insolubility of the resulting alkaline phosphate in water) I overcome by a subsequent fusion of the alkaline slag produced in the basic furnace or converter, with an additional quantity of an alkaline salt, (for which purpose the carbonate is always preferable;) but either the sulphates or the chlorides (aided by steam) may be employed. This operation may be performed either by adding the alkaline salt in a solid or molten state to the fluid slag, or by mixing the two in a solid state and subsequently fusing them together in a basic or neutrally lined open-hearth furnace or in a small basic-lined cupola. In place of fusing the alkaline slag with an alkaline compound, it may be ground and boiled in a strongly alkaline solution of sodium carbonate or hydrate. The soluble alkaline phosphate formed from the insoluble alkaline phosphoric slag in this manner can be dissolved out in water and obtained partially pure by evaporation and crystallization; or the solution may be treated in the ordinary way with lime or carbonate of lime to form a phosphate of lime, the soda being thus recovered as hydrate or carbonate.

In place of employing either an alkaline carbonate or chloride in the basic or neutrally lined furnace or converter in which the operation of eliminating the phosphorus from the pig metal is employed, I propose to employ the alkaline phosphate obtained as above, (and which for the purposes of this application I speak of as "trisodic phosphate.") I always prefer that the metal shall have been first desiliconized before any addition of alkaline salt is made, and the silicious slag poured off as completely as possible. This trisodic phosphate I prepare in actual practice by taking the alkaline phosphoric slag obtained from a former operation, and which may be described as "monosodic phosphate," and fusing it with a sufficient amount of an alkaline salt (for which purpose I always prefer to use the carbonate) to give with the alkali already present in the original slag at least three equivalents of base ($Na_2O$) for each equivalent of phosphoric acid. This fusion may be made by running into the molten slag contained in a ladle or furnace the requisite amount of alkali, molten or otherwise. A convenient method of working is to run the alkaline slag from the basic Bessemer or Siemens furnace into a basic or neutrally lined ladle, and to run the ladle to such a position that the alkaline carbonate, previously melted in a small furnace or cupola, may be readily run into the ladle, or so that the contents of the ladle may be run in upon the melted carbonate. The reaction is quickly effected, and the resulting trisodic phosphate slag (which is mixed with oxides of iron, manganese, &c.) may be used direct as the alkaline addition made during the dephosphorization of phosphoric pig-iron in a basic or neutrally lined converter or Siemens furnace.

In place of using an alkaline carbonate, an alkaline sulphate may be employed, preferably mixed with coke-dust. In this case, however, the resulting fused mass cannot be used directly in the converter or furnace, owing to the sulphur present.

Alkaline chlorides, aided by steam, may be used to effect the transformation of the monobasic salt into a more basic phosphate. In this case hydrochloric acid is given off and must be condensed. This reaction is considerably shorter than the fusion with carbonate. In any case the trisodic phosphate may be separated from the metallic oxides and other insoluble impurities by digesting in water and subsequent crystallization, or the fused mass may be allowed to cool slowly, when the upper portion will consist of nearly pure alkaline salts, the lower portion containing the metallic oxides.

I do not claim, broadly, obtaining a soluble phosphate from pig-iron directly, or by the subsequent addition of an alkali to convert the insoluble into a soluble phosphate, as my invention relates to obtaining phosphates from a basic slag in which is taken up the phosphoric acid of the pig.

Having thus described the nature of my invention, what I claim, and desire to secure by Letters Patent, is—

1. The process for producing soluble alkaline phosphates, which consists in adding to phosphoric pig-iron (during its conversion into iron or steel in a basic or neutrally lined converter or furnace) trisodic or tripotassic phosphate, or phosphate containing at least three equivalents of base for each equivalent of phosphoric acid contained in the charge, substantially as and for the purposes set forth.

2. The process of producing from the phosphorus contained in pig-iron soluble alkaline phosphates by first forming a mono-alkaline phosphate in the furnace or converter, and subsequently rendering the phosphoric acid contained in this soluble in water by combining therewith carbonate of soda, or the described equivalents, while in a state of fusion, as and for the purpose set forth.

In witness whereof I have hereunto set my hand in the presence of two subscribing witnesses.

THOMAS TWYNAM.

Witnesses:
PHILIP M. JUSTICE,
ALLEN P. JONES.